(12) United States Patent
Engstrom et al.

(10) Patent No.: US 7,103,850 B1
(45) Date of Patent: Sep. 5, 2006

(54) MULTI-PLANE METAPHORIC DESKTOP AND METHODS OF OPERATION ASSOCIATED THEREWITH

(75) Inventors: Eric Engstrom, Kirkland, WA (US); Jeffrey G. Ort, Redmond, WA (US)

(73) Assignee: Hall Aluminum, LLC, Los Altos, CA (US)

( * ) Notice: Subject to any disclaimer, the term of this patent is extended or adjusted under 35 U.S.C. 154(b) by 494 days.

(21) Appl. No.: 09/718,870

(22) Filed: Nov. 20, 2000

(51) Int. Cl.
*G06F 3/00* (2006.01)

(52) U.S. Cl. .................................... 715/778; 715/796

(58) Field of Classification Search ............... 345/850, 345/848, 778, 760, 781, 783, 646, 790, 782, 345/791, 793, 794, 795, 796, 797, 836, 852, 345/629, 672, 473; 715/790, 782, 791, 793, 715/794, 795, 796, 797, 836, 852, 850, 848, 715/778, 760, 781, 783
See application file for complete search history.

(56) References Cited

U.S. PATENT DOCUMENTS

| | | | | |
|---|---|---|---|---|
| 4,899,136 A | * | 2/1990 | Beard et al. | 340/706 |
| 5,303,388 A | * | 4/1994 | Kreitman et al. | 715/836 |
| 5,485,197 A | * | 1/1996 | Hoarty | 725/37 |
| 5,515,486 A | * | 5/1996 | Amro et al. | 715/848 |
| 5,651,107 A | * | 7/1997 | Frank et al. | 345/768 |
| 5,678,015 A | * | 10/1997 | Goh | 715/782 |
| 5,880,733 A | * | 3/1999 | Horvitz et al. | 345/850 |
| 6,363,404 B1 | * | 3/2002 | Dalal et al. | 715/513 |
| 6,429,883 B1 | * | 8/2002 | Plow et al. | 345/768 |
| 6,552,733 B1 | * | 4/2003 | Taylor et al. | 345/619 |
| 6,556,225 B1 | * | 4/2003 | MacPhail | 345/848 |
| 6,590,592 B1 | * | 7/2003 | Nason et al. | 715/778 |
| 6,760,750 B1 | * | 7/2004 | Boneh et al. | 709/204 |

\* cited by examiner

*Primary Examiner*—Kieu D. Vu
(74) *Attorney, Agent, or Firm*—Schwabe, Williamson & Wyatt, P.C.

(57) ABSTRACT

A computing device is provided with a number of programming instructions to cause display of first execution results of a first set of applications in a first plane of a metaphoric desktop, and display of second execution results of a second set of applications in a second plane of the metaphoric desktop. In one embodiment, the programming instructions are further designed to morph the metaphoric desktop from one plane to another. In one embodiment, the second set of applications are on-line applications, and the programming instructions are designed to cause the metaphoric desktop to morph from the first plane to the second plane when the computing device is being connected on line; and cause the metaphoric desktop to morph back to the first plane in response to a user request to return to the first plane.

31 Claims, 14 Drawing Sheets

MULTI-PLANE METAPHORIC DESKTOP AND METHODS OF OPERATION ASSOCIATED THEREWITH

BACKGROUND OF THE INVENTION

1. Field of the Invention

The present invention relates to the fields of data processing. More specifically, the present invention relates to the provision of graphical user interface.

2. Background Information

Graphical user interface (GUI) is known in the art. In particular, the single plane metaphoric desktop is well known in the art, adopted by numerous operating systems, including the Windows Family of Operating Systems, available from Microsoft of Redmond, Wash.

In a single plane metaphoric desktop, various icons are provided to represent the user's computer, the user's network neighborhood, mapped devices, installed programs, file/document folders, the files/documents themselves, and so forth. A user would access the various resources, files and documents by interacting with the icons, as one would interface with various objects in one's desktop in the physical world.

Further, various display windows are typically rendered on the single plane desktop to facilitate concurrent displays of execution results of multiple applications executing at the same time, including execution results or contents provided by remote "on-line" applications, such as content or web servers of the world wide web. The execution results or contents provided by the applications are rendered or displayed in their corresponding display windows. Under the prior art single plane metaphoric desktop GUI, no distinctions are made between rendering the execution results or provided contents of "locally" executed applications, and remotely executed "on-line" applications.

With advances in integrated circuit, microprocessor, networking and communication technologies, increasing number of devices, in particular, digital computing devices, are being "networked" together, via persistent wire line or wireless networking connections as well as dial up connections. As a result, more and more network dependent applications are deployed, including emails, e-commerce, and the earlier mentioned world wide web. Further, the provided contents have gone from mundane textual contents to rich multi-media contents. At the same time, as the affordability of these network enabled devices continue to improve, more and more novice users are now going "on-line".

Thus, further enhancements to the present GUI that provide even greater user experience, especially for the content rich execution results of the on-line applications, are desired.

SUMMARY OF THE INVENTION

A computing device is provided with a number of programming instructions to cause display of first execution results of a first set of applications in a first plane of a metaphoric desktop, and display of second execution results of a second set of applications in a second plane of the metaphoric desktop. In one embodiment, the programming instructions are further designed to morph the metaphoric desktop from one plane to another. In one embodiment, the second set of applications are on-line applications, and the programming instructions are designed to cause the metaphoric desktop to morph from the first plane to the second plane when the computing device is being connected on line; and cause the metaphoric desktop to morph back to the first plane in response to a user request to return to the first plane.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented using terms such as end-user interfaces, buttons, and so forth, commonly employed by those skilled in the art to convey the substance of their work to others skilled in the art. Parts of the description will be presented in terms of operations performed by a computing device, using terms such as monitoring, intercepting, copying, saving, replacing, and so forth. As well understood by those skilled in the art, these quantities and operations take the form of electrical, magnetic, or optical signals capable of being stored, transferred, combined, and otherwise manipulated through mechanical and electrical components of a digital system. The term digital system includes general purpose as well as special purpose computing machines, systems, and the like, that are standalone, adjunct or embedded.

Various operations will be described in turn in a manner that is most helpful in understanding the present invention, however, the order of description should not be construed as to imply that these operations are necessarily order dependent. Furthermore, the phrase "in one embodiment" will be used repeatedly, however the phrase does not necessarily refer to the same embodiment, although it may.

Overview of Applications

Figure 1A:
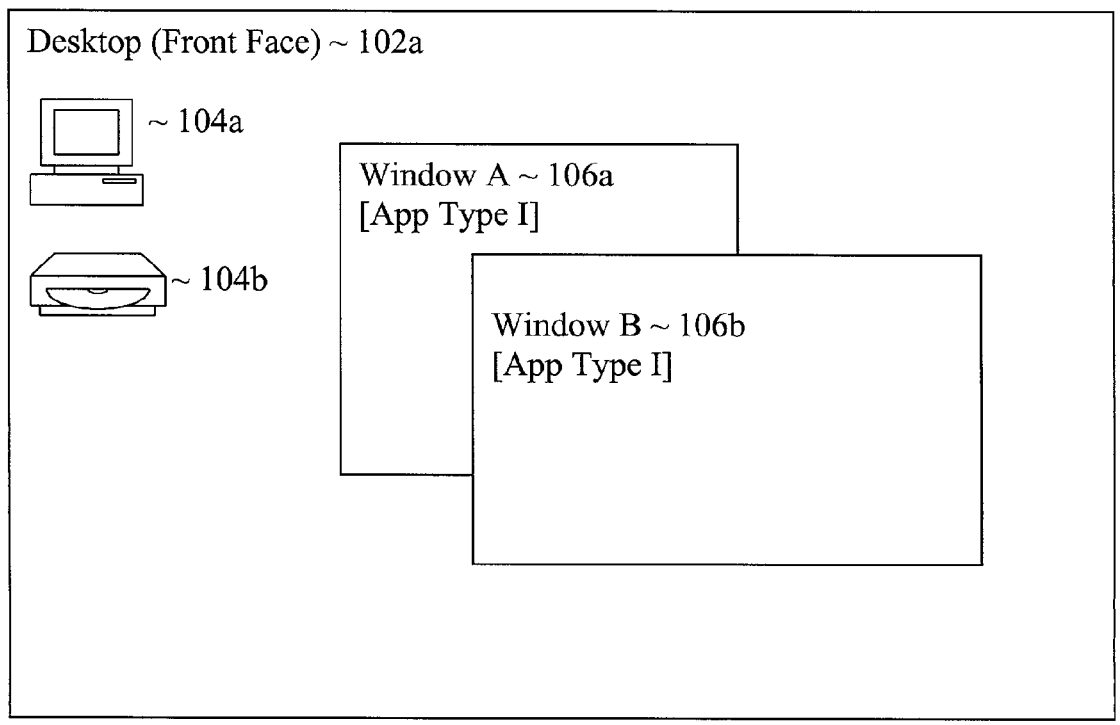
FIGS. 1a–1c illustrate an end user interface view of the present invention, in accordance with one embodiment.
Figure 1B:
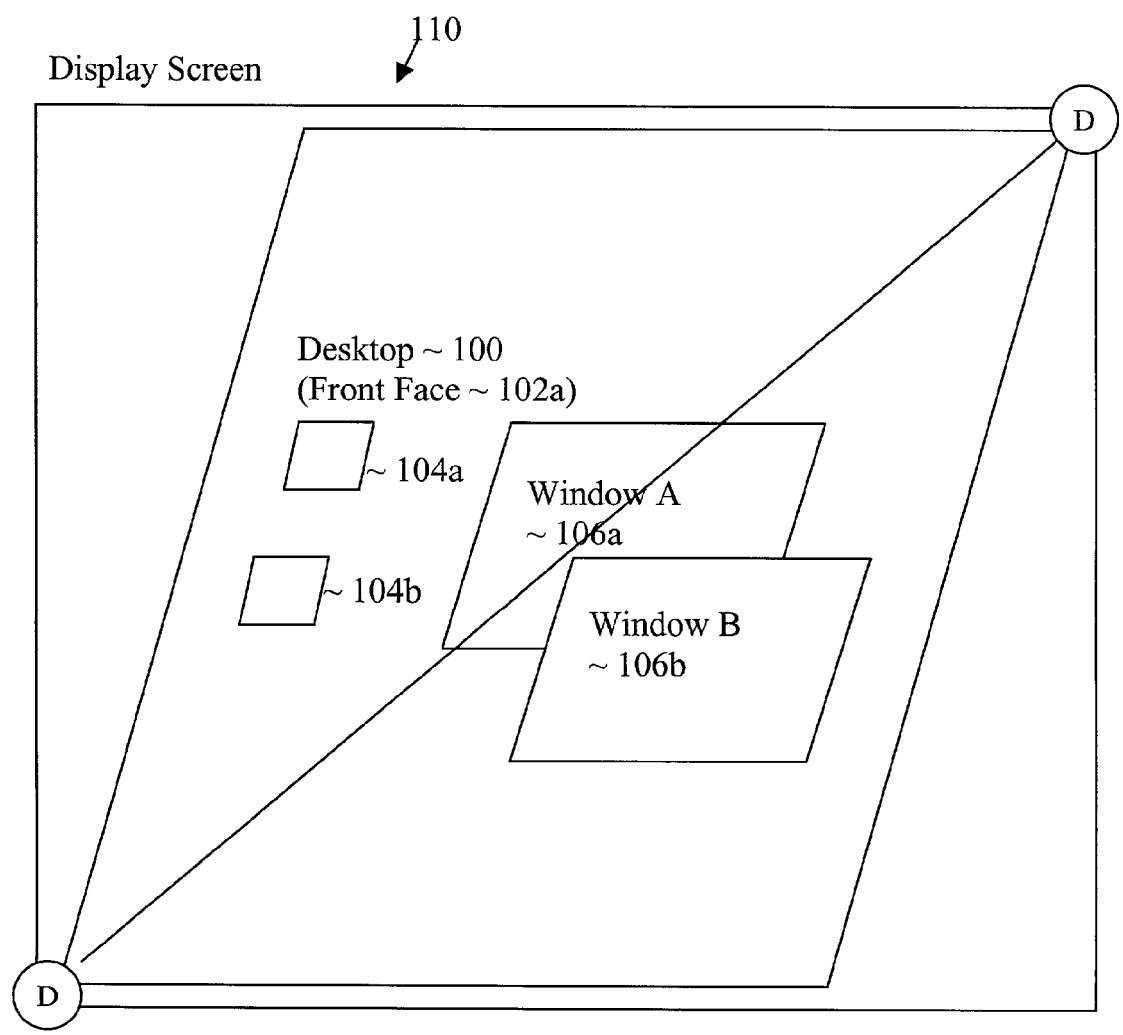
Figure 1C:
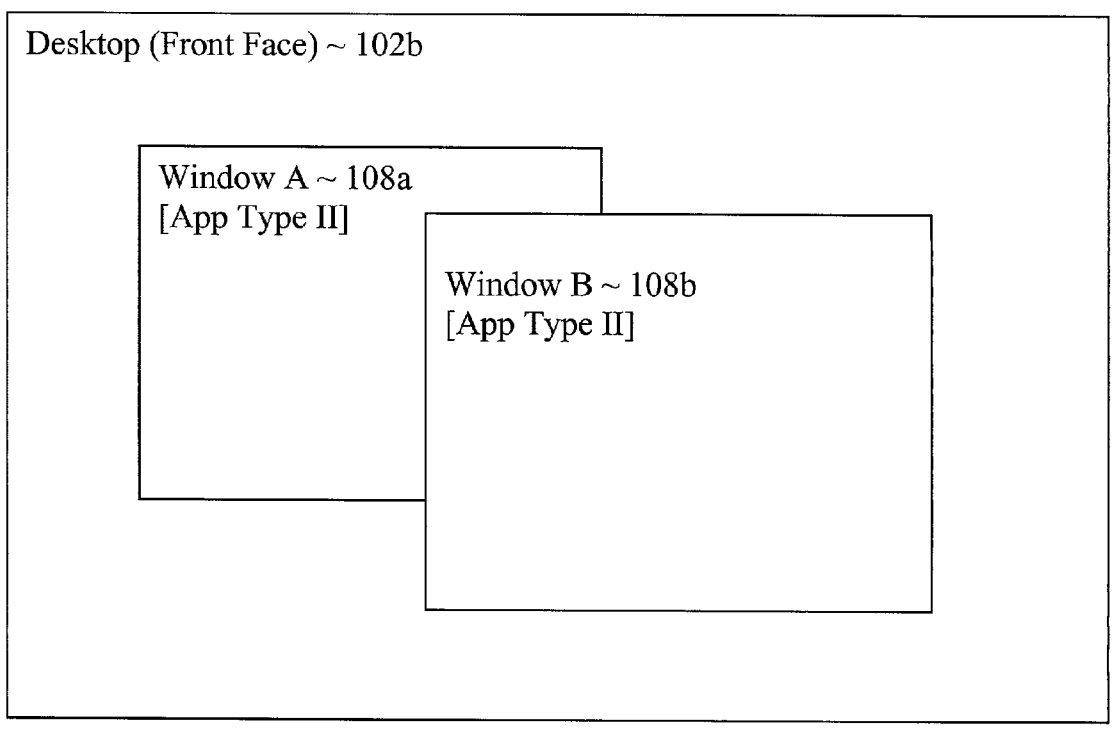

Referring now to FIGS. 1a–1c, wherein three block diagrams illustrating an end user view of the present invention, in accordance with one embodiment, are shown. Illustrated in FIG. 1a is an end user view of first plane 102a of multi-plane metaphoric desktop graphical user interface (GUI) 100 of the present invention. For the example illustration, illustrated first plane 102a is the front face of the metaphoric desktop GUI 100. Within each plane, such as illustrated front face 102a, metaphoric desktop GUI 100 is operated substantially as the prior art single plane metaphoric desktop GUI. Various icons, such as icons 104a–104b are displayed to represent various resources available on the host system, such as devices, shortcuts, folders, programs, files, documents, and so forth. Additionally, various display windows, such as display windows 106a–106b, are rendered to display the execution results of a number of applications being concurrently executed. However, in accordance with the present invention, the execution results of the applications displayed within the display windows of a plane of the multi-plane metaphoric desktop GUI of the present invention are type based. That is, under the present invention, the applications are typed, and their execution results are displayed in display windows of different planes of multi-plane metaphoric desktop GUI 100 of the present invention in accordance with their types. In one two-plane embodiment, also referred to as a front and back face embodiment, applications are divided into two types. "Locally" executed applications are considered as one type, and "on-line" applications are considered as another type.

For the purpose of this application, the terms "local" (or "locally") and "on-line" are used in a general non-definitive manner, as shorthand labels to contrast two types of applications for convenience. What constitute "local" or "on-line" applications are application dependent, and may vary from one embodiment to another. In one embodiment, applications offered through the world wide web are considered "on-line" applications, as users generally perceive accessing one of these applications as going "on-line", and all other applications are considered "local" applications, including e.g. applications executing on a remote server coupled to the host computer through a local or even wide area network. Also, for ease of understanding, only two icons and windows are shown, and other typical GUI features are omitted from FIGS. 1a–1c.

Continuing with FIGS. 1–3, in accordance with the present invention, under pre-determined conditions, to be described more fully below, multi-plane metaphoric desktop 100 would morph itself from a current visible plane, such as front face 102a (illustrated by FIG. 1b), to a second plane, such as back face 102b, where a number of display windows, such as display windows 108a and 108b, are rendered to display execution results of a number of "on-line" applications concurrently being executed, such as contents served up by a number of web servers (illustrated by FIG. 1c). For the illustrated embodiment, the morphing of multi-plane metaphoric desktop 100 is conveyed by animating a rotation over diagonal axis D—D.

Thus, under the present invention, a more dramatic experience may be provided to a user, when the user switches from applications of one type to another, e.g. when the user goes from "local" applications to "on-line" applications, or when the user goes back from "on-line" application to "local" applications.

Figure 2A:
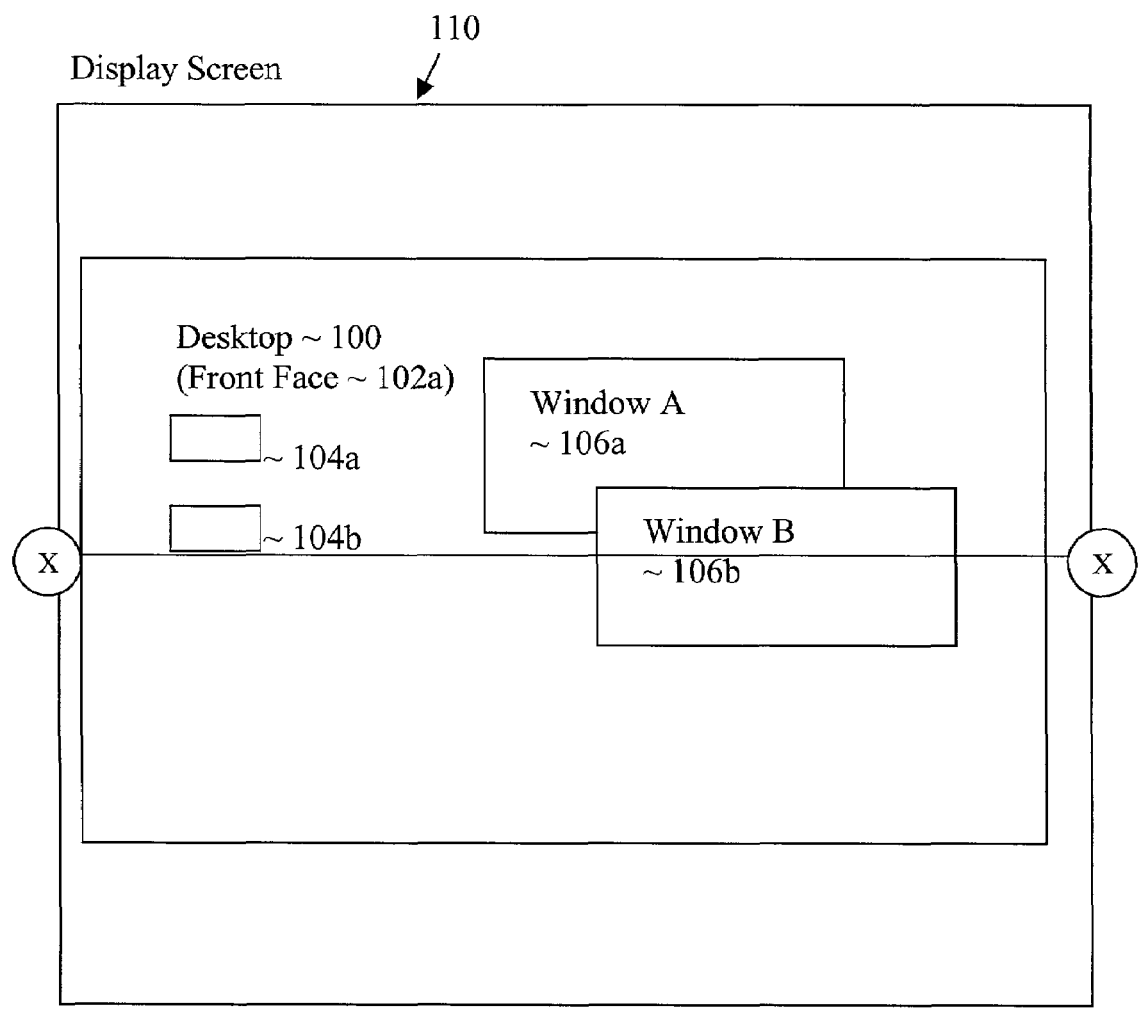
FIGS. 2a–2b illustrate two end user interface views of the present invention, in accordance with two alternate embodiments.
Figure 2B:
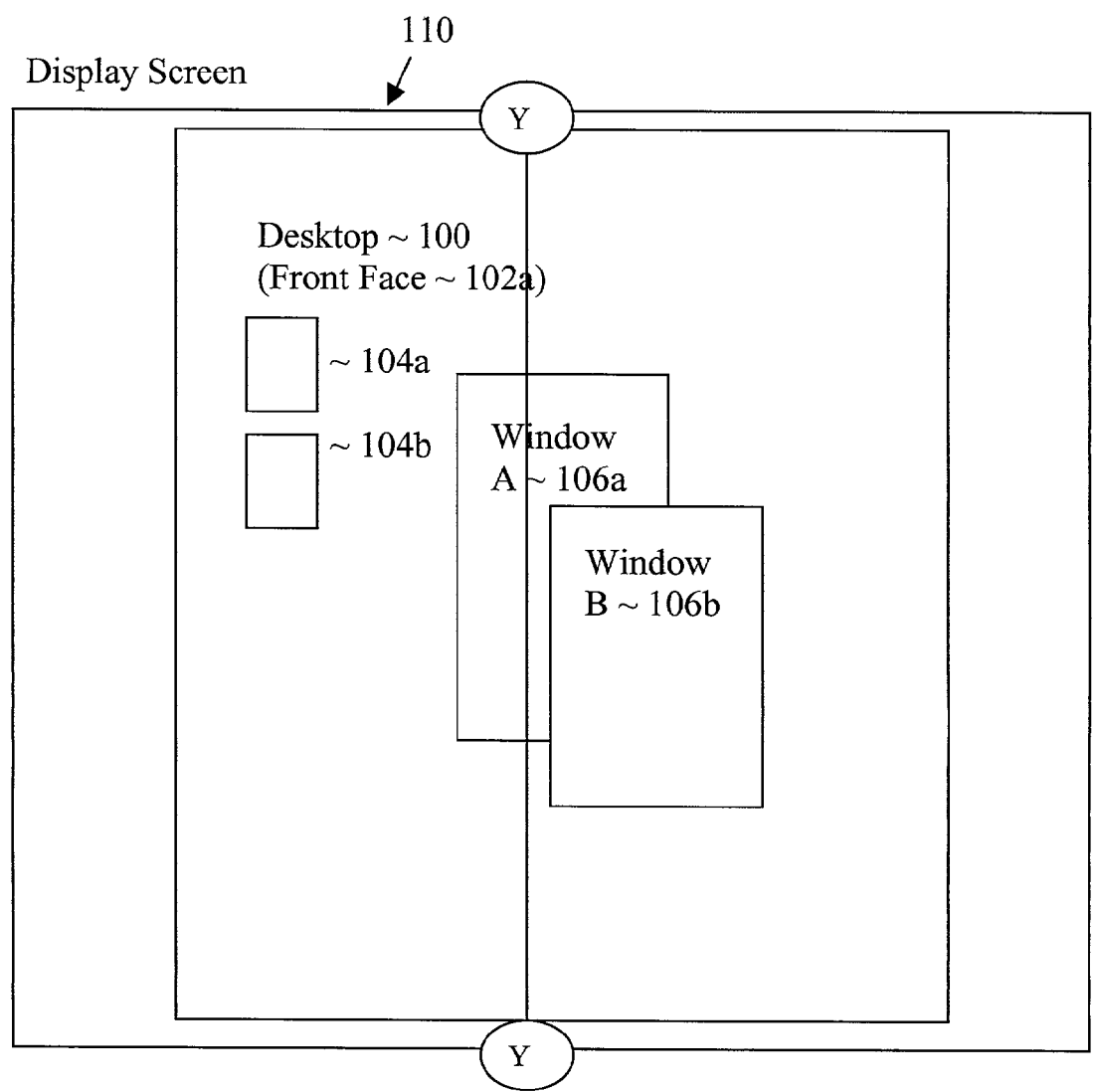

FIGS. 2a–2b illustrate two alternate embodiments for animating the morphing of multi-plane desktop 100 of the present invention. More specifically, FIG. 2a illustrates conveying of the morphing by animating a rotation over horizontal axis X—X, whereas FIG. 2b illustrates conveying of the morphing by animating a rotation over vertical axis Y—Y.

Figure 3A:
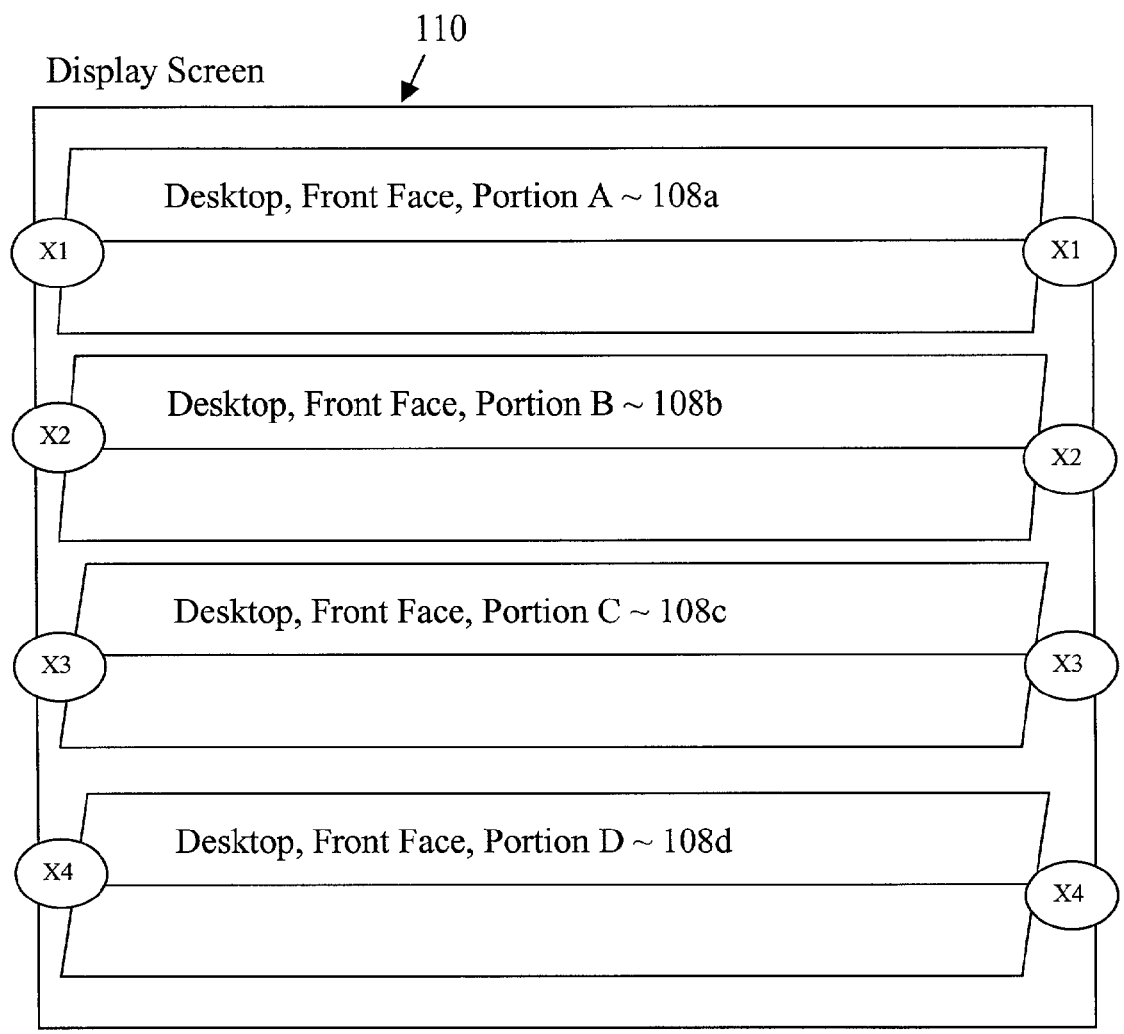
FIGS. 3a–3b illustrate another two end user interface views of the present invention, in accordance with yet another two alternate embodiments.
Figure 3B:
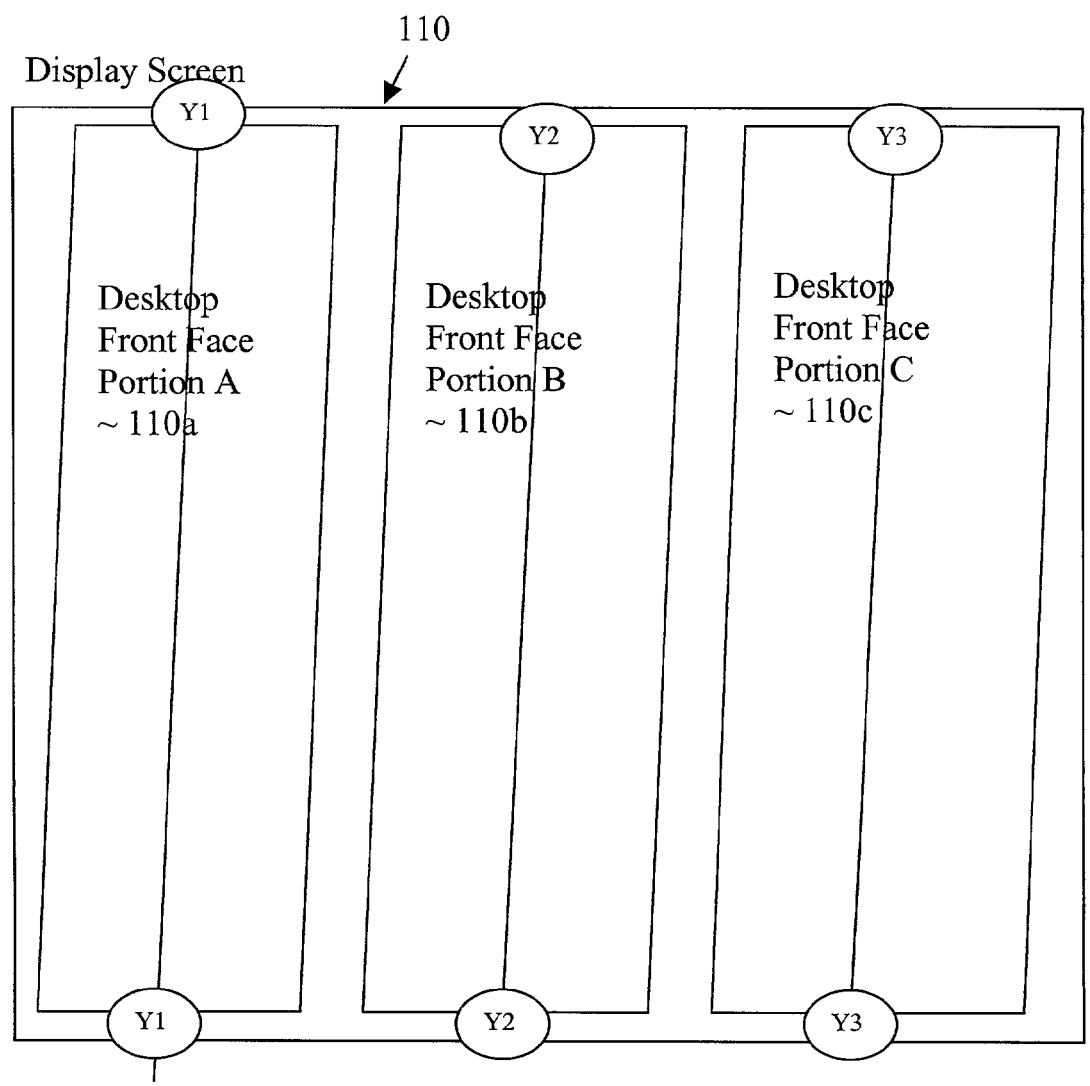

FIGS. 3a–3b illustrate another two alternate embodiments for animating the morphing of multi-plane desktop 100 of the present invention. More specifically, FIG. 3a illustrates conveying of the morphing by animating a number of simultaneous rotations of different portions of desktop 100 over a number of corresponding horizontal axes X1–X3, whereas FIG. 3b illustrates conveying of the morphing by animating a number of simultaneous rotations of different portions of desktop 100 over a number of vertical axes Y1–Y3.

Obviously, the number of portions and axes employed are for illustrative purpose only. The present invention may be practiced with more or less portions/axes. In fact, the present invention may be practiced with other types of morphing when switching from a current visible plane to another plane, making the other plane the current visible plane.

Method

Figure 4A:
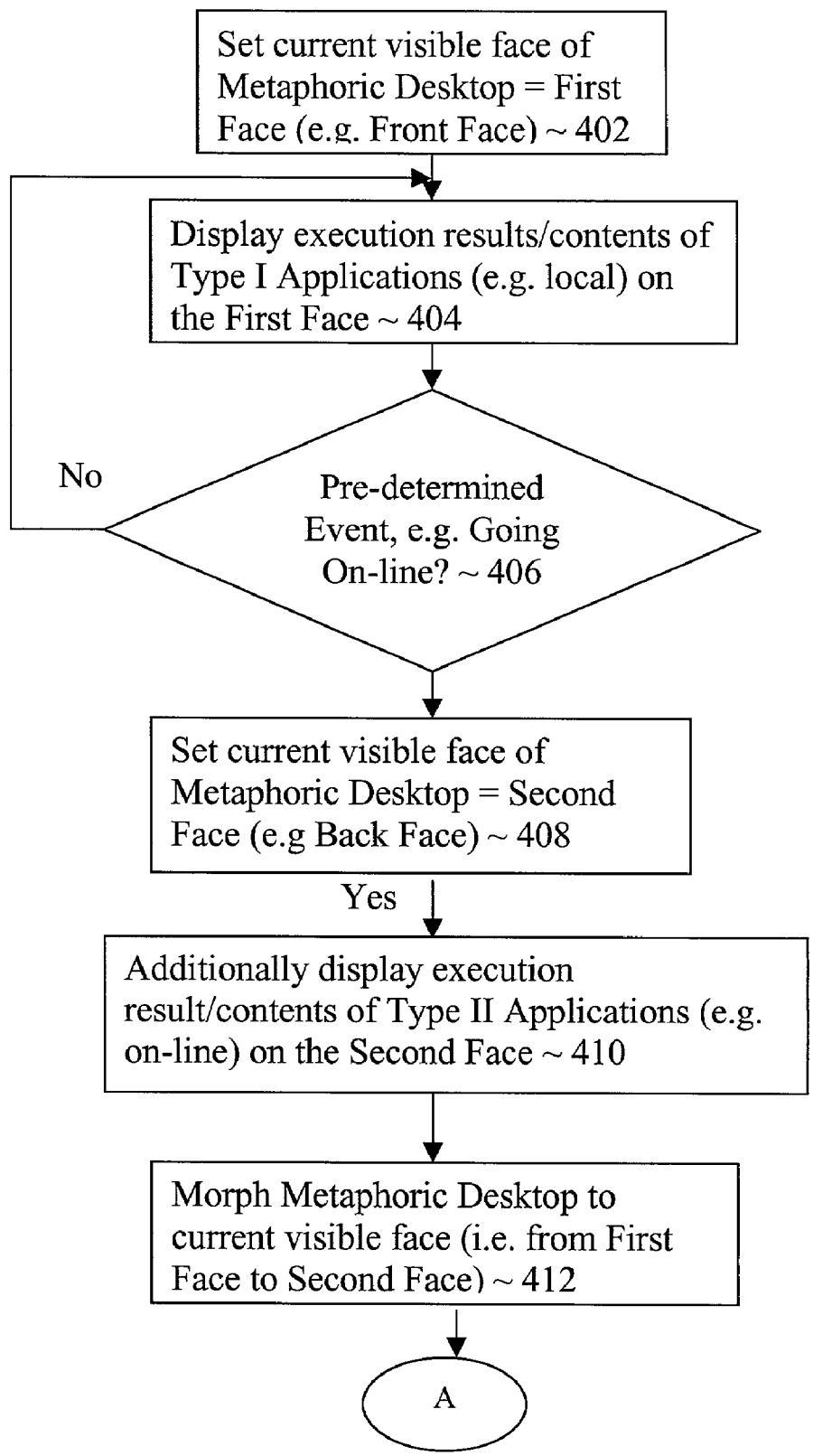
FIGS. 4a–4b illustrate a method view of the present invention, in accordance with one embodiment.
Figure 4B:
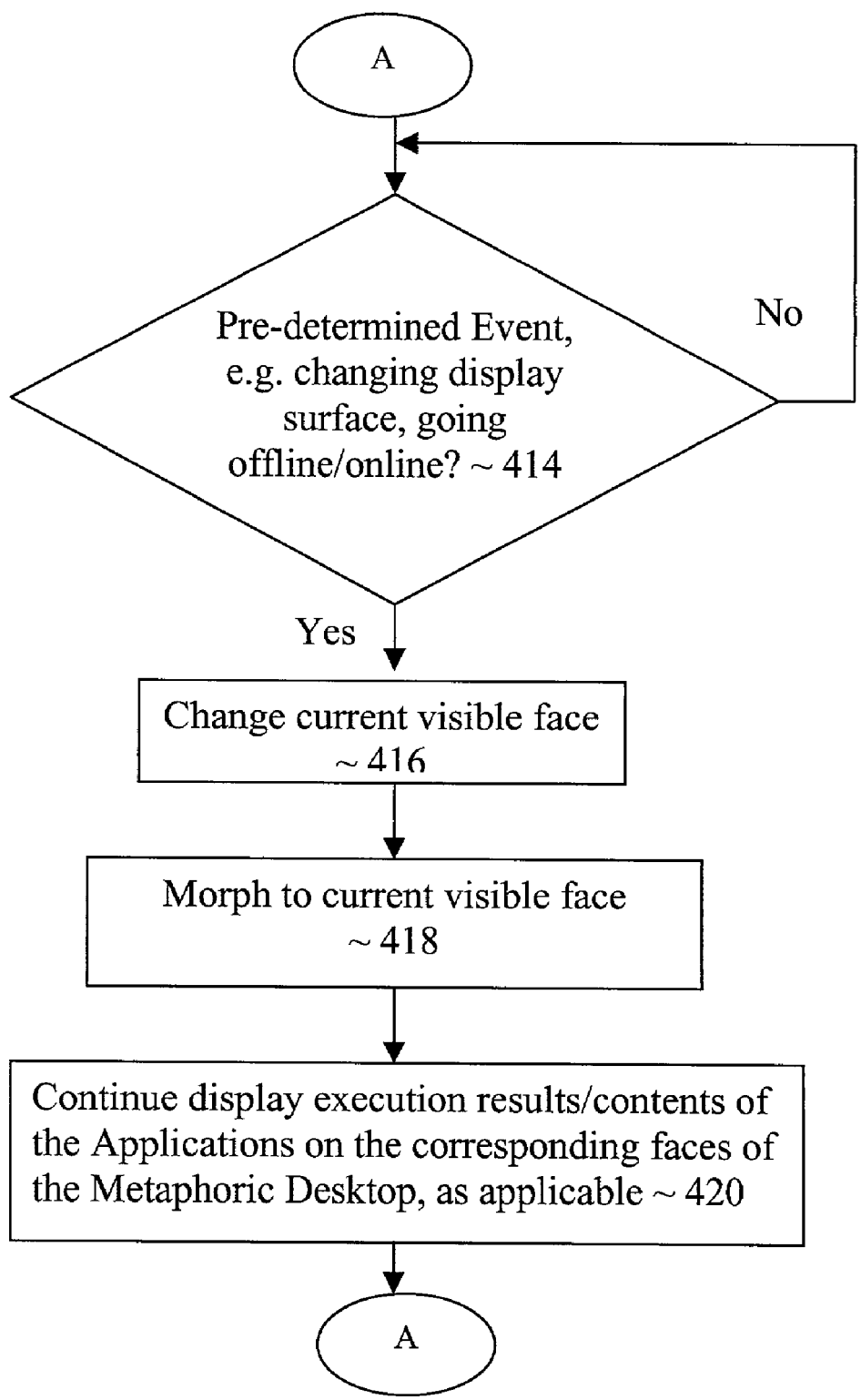

FIGS. 4a–4b illustrate a method view of the present invention, in accordance with one embodiment. As illustrated, at block 402, one plane or face of the multi-plane metaphoric desktop GUI, e.g. the front face, is "selected" as the current visible plane/face. At block 402, execution results of the applications of the type corresponding to the plane/face selected to be the current visible plane/face, e.g. "locally" executed applications, are rendered in the corresponding display windows in the plane/face. At block 406, it is determined whether certain plane/face switching events have been detected, e.g. the user going "online". If not, the process returns to block 404. Eventually, when one such event is detected, the process continues at block 408.

As illustrated, at block 408, a second plane/face, e.g. the back face, is selected to be current visible plane/face. At block 410, the execution results of the applications of the type corresponding to the newly selected current visible plane/face, e.g. "online" applications, are additionally rendered and displayed in their corresponding display windows within the current visible plane/face. At block 412, a series of animation operations, e.g. rotation over a selected axis, are performed to provide the user with the perception of the desktop GUI morphing from the first plane/face to the second plane/face.

Thereafter, the process continues at block 414, where once again plan/face switching events, such as the user going offline/online are monitored, while the execution results of the applications of the various types are continue to be rendered in the display windows of the corresponding planes/faces, even though only the display windows of the current visible plane/face are visible. The process remains at block 414 until eventually one such plane/face switching event is detected. Upon detection of such an event, at block 416, a new current visible plane/face is selected. At block 418, again a series of animation operations are performed to provide the user with a perception of the desktop GUI morphing from the previously current visible plane/face to the newly selected current visible plane/face. At block 420, the corresponding rendering of the execution results of the applications in the display windows of the corresponding planes/faces continue.

The operations of blocks 414–420 continue, until the user ends his/her current session, e.g. logging off or otherwise shutting down his/her system.

Component View of Environment

Figure 5:
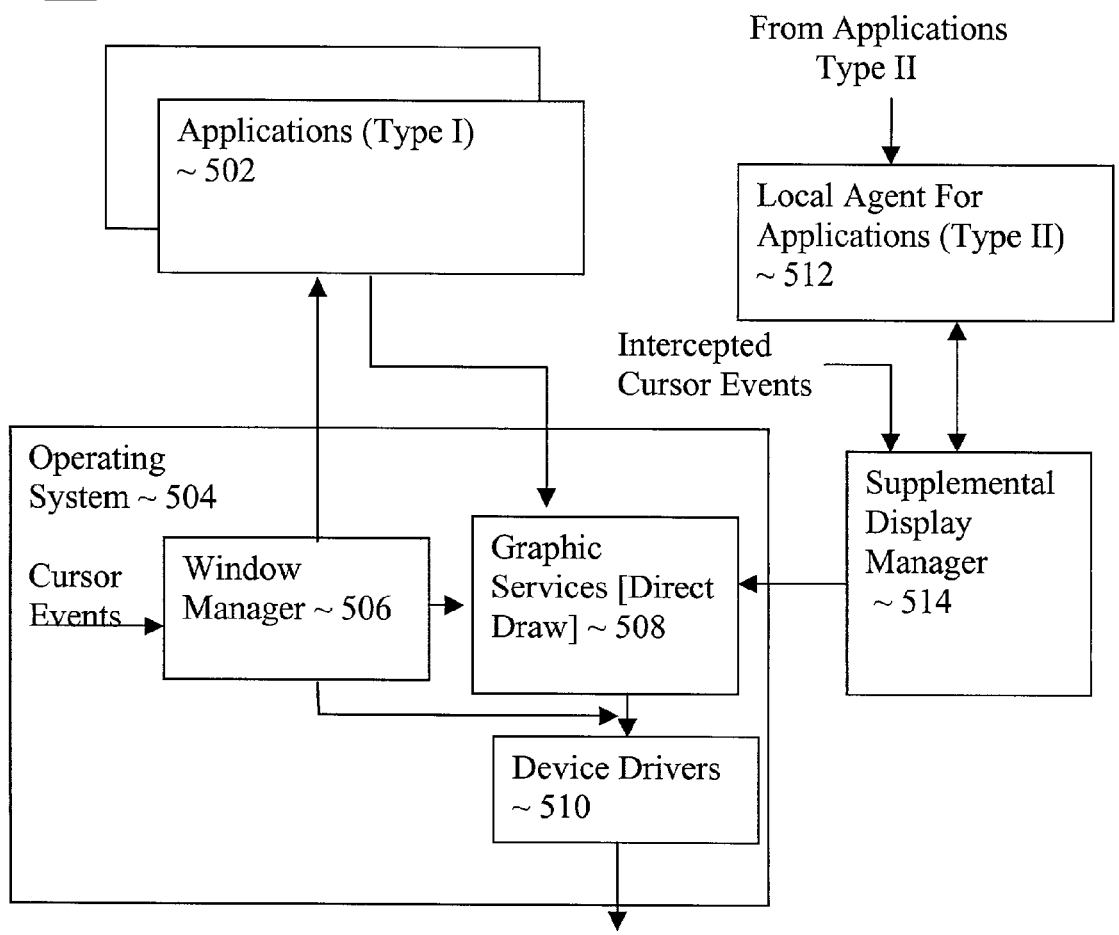
FIG. 5 illustrates a component view of a system, incorporated with the teachings of the present invention, in accordance with one embodiment.

Referring now to FIG. 5, wherein a block diagram illustrating a component view of a system environment suitable for practicing the present invention, in accordance with one embodiment. As illustrated, system environment 500 includes operating system 504 having window manager 506, graphics services 508 and device drivers 510, offering a number of system services in support of applications, such as applications 502. Among the services offered are windowing services offered by window manager 506 to facilitate concurrent display of the execution results of multiple applications 502 executing at the same time. The services also include graphics services offered by graphics services 508 to facilitate graphics rendering by the executing applications. These graphics services include high level graphics calls for rendering complex graphical objects, as well as low level "direct draw" services for rendering low level detail graphical primitives. Device drivers 510 offer various device specific services, including in particular display rendering and associated operations on the pixel value contents of the display screen memory (not shown). Further, operating system 504 includes services for notifying applications 502 of cursor events associated with the display windows of the applications, as well as automatic handling of a number of basic cursor events, e.g. "dragging" or otherwise relocating a display window.

Additionally, for the illustrated embodiment, environment 500 includes supplemental display manager 514 and local agent 516. Supplemental display manager 514 operates to supplement window manager 506 in providing like kind of services, such as windowing services, to applications of the other types, whose execution results are to be displayed in display windows of the additional planes/faces. For the illustrated embodiment, supplemental display manager 514 effectuates provisions of the like services with the assistance of local agent 512 (the other applications are assumed to be remote "on-line" applications). Similar to window manager 506, supplemental display manager 514 also uses the graphics services and device services offered by graphics services 508 and device drivers 510 respectively.

Window manager 506, graphics services 508, device driver 510 and the services they offer are known in the art. The essential aspects of the supplemental display manager 514 and local agent 512 will be further described in turn below.

Supplemental Display Manager

Figure 6A:
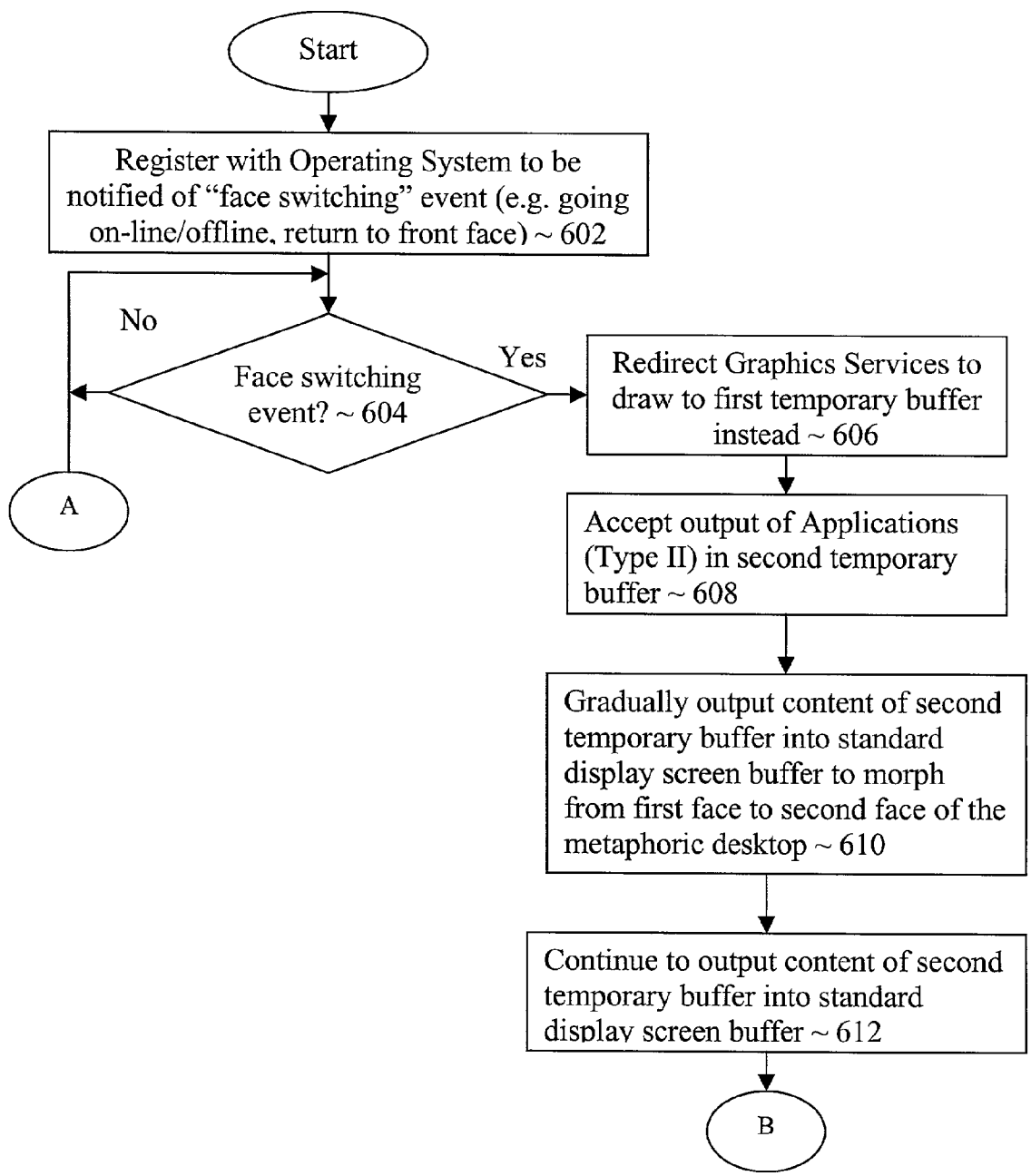
FIGS. 6a–6c illustrate the operational flow of the relevant aspects of the supplemental display manager of FIG. 5, in accordance with one embodiment.
Figure 6B:
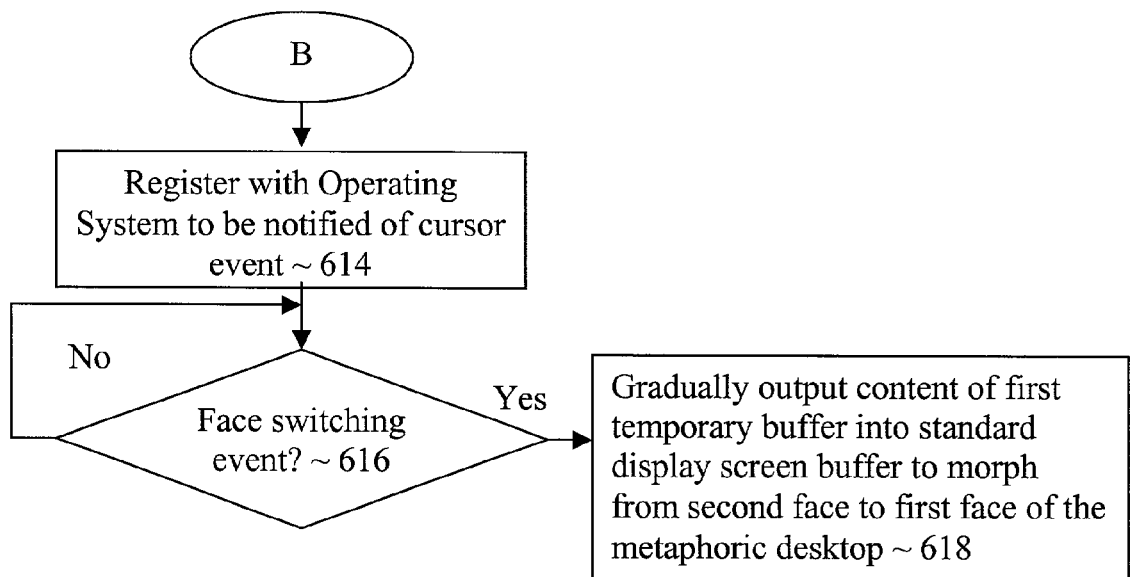
Figure 6C:
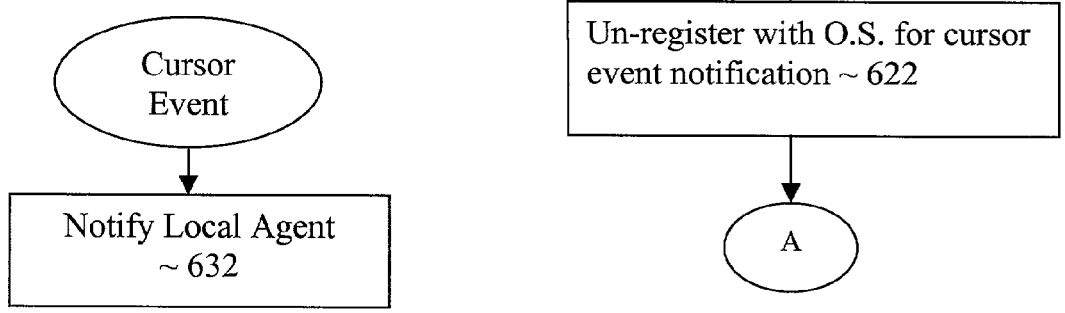

FIGS. 6a–6c illustrate the operational flow of the relevant aspects of supplemental display manager 514 of the FIG. 5, in accordance with one embodiment. As illustrated, upon initialization or set up, supplemental display manager 514 "registers" itself with operating system 504 to be notified of certain events, which are considered to be display plane/face switching events. Examples of such events include a user going on-line (as indicated e.g. by connection to a predetermined port), or going offline (as indicated e.g. by disconnection from the predetermined port). In one embodiment, certain predetermined key sequences (e.g. ctrl-s) are also considered to be display plane/face switching events. The number and exact nature of events to be considered as plane/face switching events are application dependent. More or less predetermined events may be employed.

Upon registration, as illustrated, supplemental display manager 514 awaits for notifications of the events of interest, block 604. Upon first notified of such an event (which for the illustrated embodiment is assumed to occur while the "front" plane/face where the graphics services draw to is the current visible plane/face), supplemental display manager 514 redirects graphics services to output to a first temporary buffer instead, block 606. That is, when requested by applications 502 to render their execution results in their display windows, instead of requesting the device drivers 510 to output the appropriate graphics/texts to the standard display screen memory buffer (not shown), graphics services 508 would output the appropriate graphics/texts to the designated first temporary buffer.

Additionally, supplemental display manager 514 would begin to accept output displays of the applications of the current visible display plane/face in a second temporary buffer. For the illustrated embodiment, it is assumed that there are two display planes/faces, thus the other display plane/face by default is the next current visible plane/face. In alternate embodiments where more than 2 planes/faces are employed, any one of a number of application dependent approaches may be employed to determine which of the other planes/faces is to be selected as the next current visible plane/face, and have that other plane/face set as the current visible plane/face accordingly. Additionally, for the illustrated embodiment, the applications corresponding to the second plane/face are assumed to be "online" applications, whose outputs are received by supplemental display manager 514 though local agent 512.

Upon beginning acceptance of the execution results of the applications corresponding to the now current visible plane/face, supplemental display manager 514 further causes contents of the now current visible plane/face to be gradually output to the standard display screen buffer, to provide the user with the perception of the desktop morphing from the previous current visible plane/face to the new current visible plane/face. In one embodiment, the morphing perception is effectuated by performing a series of animation operations combining the contents of the screen display buffer and the second temporary buffer, to portray a rotation of the desktop over a predetermined axis, such as a diagonal, one or more horizontal/vertical axes, as described earlier, referencing FIGS. 2a–2b and FIGS. 3a–3b.

Thereafter, supplemental display manager 514 continues to accept execution results of the applications corresponding to the now current visible plane/face, while the graphics services would output the execution results of the applications corresponding to the previously current visible plane/face to the first temporary buffer. The contents of the previous visible plane/face are advantageously maintained (in the first temporary buffer) to ensure the multi-plane operations are transparent to the applications corresponding to the previous visible plane/face (e.g. "local" applications). Further, the contents of the previous visible plane/face may be readily available, when it is to be made to visible plane/face again.

Once the switching is effectuated, as illustrated, at block 614, supplemental display manager 514 further registers with operating system 504 to be notified of all cursor events. Thereafter, at block 616, supplemental display manager 514 awaits notifications of face switching events again. Upon notified of another display plane/face switching event, supplemental display manager 514, at block 618 (for the illustrated embodiment), gradually outputs the contents of the first temporary buffer to the standard display screen buffer, providing the user with the perception of the desktop morphing from the second display plane/face back to the first display plane/face. Again, as described earlier, the morphing may be effectuated through a series of animation operations.

At block 620, upon effectuating the desired morphing, supplemental display manager 514 redirects graphics services 508 to resume outputting the execution results of the applications corresponding to the first plane/face to the standard display screen memory again. Further, at block 622, for the illustrated embodiment (assuming a two-plane embodiment), supplemental display manager 514 un-registers itself with operating system 504 such that it will not be notified of cursor events again (allowing window manager 506 to resume notifying applications 502 of the first plane of associated cursor events).

Thereafter, supplemental display manager 514 continues its operations at block 604 as earlier described.

As illustrated in FIG. 6c, for the illustrated embodiment, while registered to be notified of cursor events (which is when supplemental display manager 514 causing execution results of the applications corresponding to the "second" display plane/face to be output to the display screen manager directly, and graphics services 508 has been redirected to output to the first temporary buffer), upon being notified of a cursor event, supplemental display manager 514 forwards the cursor event to the appropriate application through local agent 512. The applications in turn handle the applicable cursor events as in the prior art.

Local Agent

Figure 7A:
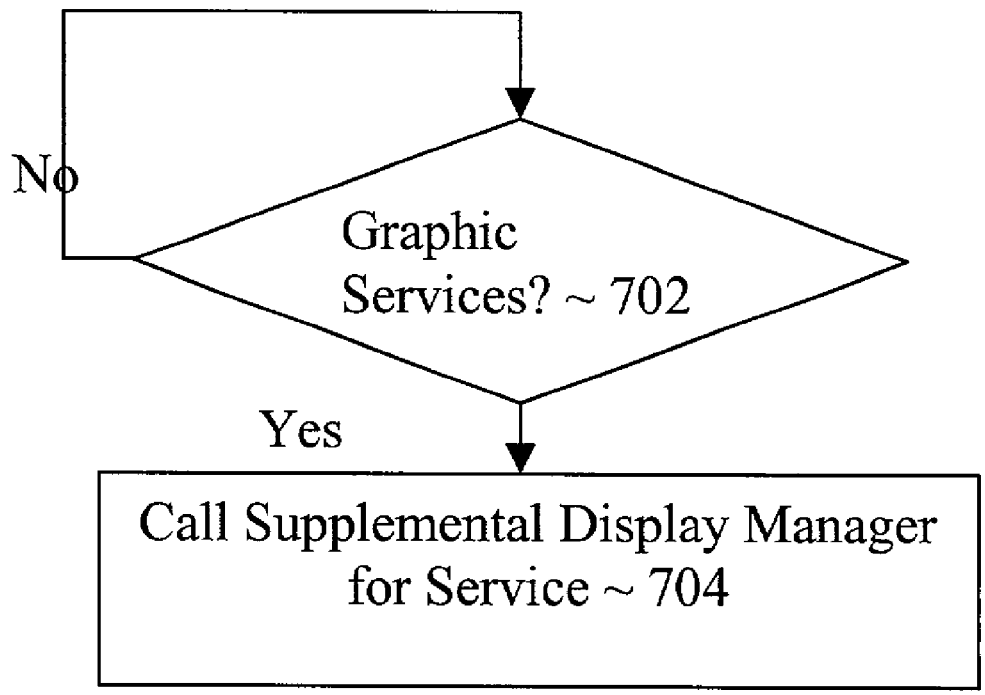
FIGS. 7a–7b illustrate the operational flow of the relevant aspects of the local agent of FIG. 5, in accordance with one embodiment.
Figure 7B:
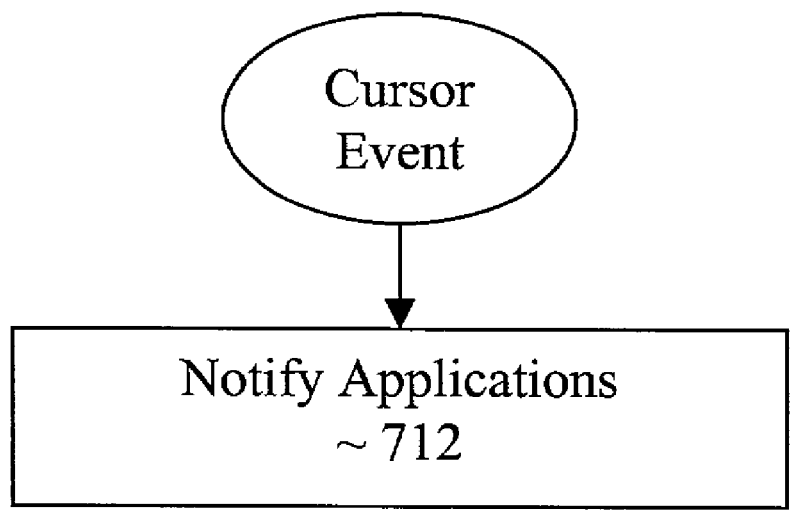

FIGS. 7a–7b illustrates the operational flow of the relevant aspects of local agent 512 of the present invention, in accordance with one embodiment. As illustrated by FIG. 7a, upon initialization or set up, local agent 512 awaits for the graphics service requests of the applications corresponding to the alternate display planes/faces to output their execution results, block 702. Upon requested, local agent 512 forwards the graphics service requests to supplemental display manager 514, which in turn outputs the graphics/texts to the second temporary buffer as early described.

As to cursor events, as illustrated by FIG. 7b, in like manner, local agent 512 awaits notification of cursor events by supplemental display manager 514. Upon being notified of such an event, local agent 512 forwards the cursor event to the appropriate application, block 712. The appropriate application may be determined in accordance with where the cursor events occurred.

Example Computer System

Figure 8:
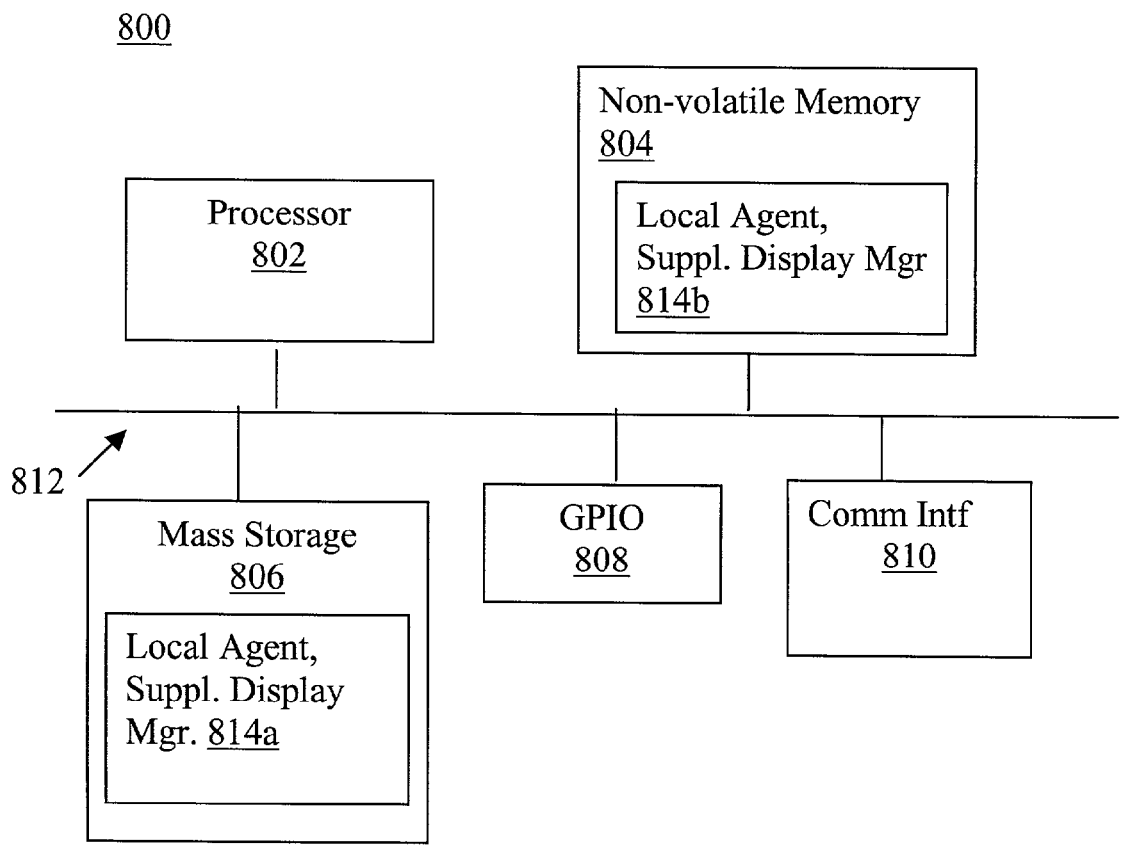
FIG. 8 illustrates an architectural view of an example computer system suitable for practicing the present invention, in accordance with one embodiment.

FIG. 8 illustrates an example computer system suitable for use to practice the present invention, in accordance with one embodiment. As shown, system 800 includes one or more processors 802 and system memory 806. Additionally, system 800 includes mass storage devices 806 (such as diskette, hard drive, CDROM and so forth), GPIO 808 (for interfacing with I/O devices such as keyboard, cursor control and so forth) and communication interfaces 810 (such as network interface cards, modems and so forth). The elements are coupled to each other via system bus 812, which represents one or more buses. In the case of multiple buses, they are bridged by one or more bus bridges (not shown).

Each of these elements performs its conventional functions known in the art. In particular, system memory 804 and mass storage 806 are employed to store a working copy 814b and a permanent copy 814a of the programming instructions implementing supplemental display manager 514 and/or local agent 512. Except for its use to host the novel supplemental display manager 514 and/or local agent 512 of the present invention. The constitution of these elements 802–814 are known, and accordingly will not be further described.

Accordingly, a multi-plane metaphoric desktop GUI, and the method of operation associated therewith have been described. It can be seen that the multi-plane metaphoric desktop of the present invention advantageously provides the user with a much dramatic user experience when the user switches between applications of different types.

While the present invention has been described in terms of the above illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A method comprising:
 rendering on a display of an apparatus, a metaphoric desktop having a front surface and a back surface, said front surface and said back surface being opposite facing surfaces of the same plane;
 rendering first execution results of first one or more applications on the front surface of the metaphoric desktop, the front surface being a currently visible surface of the metaphoric desktop resulting in the first execution results being currently visible;
 rendering second execution results of second one or more applications on the back surface of the metaphoric desktop, the back surface being currently invisible while the front surface is the currently visible surface, resulting in the second execution results being currently invisible; and
 morphing the back surface to replace the front surface to become the currently visible surface of the metaphoric desktop to make visible the second execution results, and make invisible the first execution results.

2. The method of claim 1, wherein said second one or more applications are on-line applications, and the method further comprises monitoring for the apparatus being connected on-line.

3. The method of claim 1, wherein said morphing comprises morphing from said front surface of the metaphoric desktop to the back surface of the metaphoric desktop in response to detection of an event.

4. The method of claim 1, wherein said morphing comprises animating a 180 degree rotation of the front and back surfaces of the metaphoric desktop over either a diagonal axis, a vertical axis, or a horizontal axis.

5. The method of claim 1, wherein said morphing comprises animating a plurality of 180 degree rotations of a plurality of portions of the front and back surfaces of metaphoric desktop over a plurality of corresponding vertical axes or a plurality of corresponding horizontal axes.

6. The method of claim 1, wherein
 said rendering of first execution results of the first one or more applications in a front surface of a metaphoric desktop comprises storing pictorial representations of said first execution results of the first one or more applications into a standard display screen buffer by a graphics service; and said rendering of second execution results of the second one or more applications in a back surface of the metaphoric desktop comprises redirecting said graphics service to store pictorial representations of said first execution results of said first one or more applications to an alternate display screen buffer, and storing pictorial representations of said second execution results of said second one or more applications into said standard display screen buffer.

7. The method of claim 6, wherein said second one or more applications are on-line applications; and said redirecting of said graphics service to store pictorial representations of said first execution results of said first one or more applications to an alternate display screen buffer, and subsequent storing of pictorial representations of said second execution results of said second one or more applications into said standard display screen buffer, are initially performed in response to said apparatus being connected on-line.

8. The method of claim 7, wherein the method further comprises resuming said storing of pictorial representations of said first execution results of said first one or more applications to said standard display screen buffer by said graphics service.

9. The method of claim 8, wherein said resumption is performed in response to a user request to return to said front surface of said metaphoric desktop.

10. The method of claim 1, wherein said morphing comprises animating a plurality of 180 degree rotations of a plurality of portions of the front and back surfaces of the metaphoric desktop over a plurality of corresponding vertical axes and a plurality of corresponding horizontal axes.

11. An apparatus comprising:

storage medium having stored therein a plurality of programming instructions designed to render a metaphoric desktop having a front surface and a back surface, said front surface and said back surface being opposite facing surfaces of the same plane, to render first execution results of first one or more applications on the front surface of the metaphoric desktop, the front surface being a currently visible surface of the metaphoric desktop resulting in the first execution results being currently visible, to render second execution results of a second one or more applications on the back surface of the metaphoric desktop, the back surface being currently invisible while the front surface is currently visible, resulting in the second execution results being currently invisible, and to morph the back surface to replace the front surface to become the currently visible surface of the metaphoric desktop to make the second execution results visible and make the first execution results invisible; and a processor coupled to the storage medium to execute the programming instructions.

12. The apparatus of claim 11, wherein said second one or more applications are on-line applications, and the programming instructions are further designed to monitor for the apparatus being connected on-line.

13. The apparatus of claim 11, wherein said programming instructions are further designed to morph from said front surface of the metaphoric desktop to the back surface of the metaphoric desktop in response to detection of an event.

14. The apparatus of claim 11, wherein said programming instructions are designed to effectuate said morphing by animating a 180 degree rotation of the front and back surfaces of the metaphoric desktop over either a diagonal axis, a vertical axis, or a horizontal axis.

15. The apparatus of claim 11, wherein said programming instructions are designed to effectuate said morphing by animating a plurality of 180 degree rotations of a plurality of portions of the front and back surfaces of the metaphoric desktop over a plurality of corresponding vertical axes or a plurality of corresponding horizontal axes.

16. The apparatus of claim 11, wherein said programming instructions are designed to effectuate said rendering of first execution results of the first one or more applications on a front surface of a metaphoric desktop by storing pictorial representations of said first execution results into a standard display screen buffer by a graphics service, and said rendering of second execution results of the second one or more applications in a back surface of the metaphoric desktop by redirecting said graphics service to store pictorial representations of said first execution results of said first one or more applications to an alternate display screen buffer, and storing pictorial representations of said second execution results of said second one or more applications into said standard display screen buffer.

17. The apparatus of claim 16, wherein said second one or more applications are on-line applications; and said programming instructions are designed to initially perform said redirecting of said graphics service to store pictorial representations of said first execution results of said first one or more applications to an alternate display screen buffer, and subsequent storing of pictorial representations of said second execution results of said second one or more applications into said standard display screen buffer, in response to said apparatus being connected on-line.

18. The apparatus of claim 17, wherein the programming instructions are further designed to resume said storing of pictorial representations of said first execution results of said first one or more applications to said standard display screen buffer by said graphics service.

19. The apparatus of claim 18, wherein said programming instructions are designed to perform said resumption in response to a user request to return to said front surface of said metaphoric desktop.

20. The apparatus of claim 11, wherein said programming instructions are designed to effectuate said morphing by animating a plurality of 180 degree rotations of a plurality of portions of the front and back surfaces of the metaphoric desktop over a plurality of corresponding vertical axes and a plurality of corresponding horizontal axes.

21. A graphical user interface comprising:

a metaphoric desktop having a front surface and a back surface, said front surface and said back surface being opposite facing surfaces of the same plane with only one of said front surface and said back surface being currently visible at a time;

the front surface being used to display first execution results of a first one or more applications when the front surface is a currently visible surface, resulting in the first execution results being currently visible; and the back surface being used to display second execution results of a second one or more applications, invisible while the front surface is the currently visible surface, and becoming visible when the metaphoric desktop morphs the back surface to replace the front surface as the currently visible surface, the first execution results becoming invisible after the back surface replaces the front surface as the currently visible surface.

22. The graphical user interface of claim 21, wherein the metaphoric desktop morphs from the front surface to the back surface in response to an event.

23. The graphical user interface of claim 21, wherein said morphing comprises a 180 degree rotation of the front and back surfaces of the metaphoric desktop over either a diagonal axis, a vertical axis, or a horizontal axis.

24. The graphical user interface of claim 21, wherein said morphing comprises a plurality of 180 degree rotations of a plurality of portions of the front and back surfaces of the metaphoric desktop over a plurality of corresponding vertical axes or a plurality of corresponding horizontal axes.

25. The graphical user interface of claim 21, wherein said morphing comprises a plurality of 180 degree rotations of a plurality of portions of the front and back surfaces of the metaphoric desktop over a plurality of corresponding vertical axes and a plurality of corresponding horizontal axes.

26. A system comprising:
   a communication interface;
   storage medium having stored therein a plurality of programming instructions designed to render first execution results of first one or more applications on a front surface of a metaphoric desktop having the front surface and a back surface, said front surface and said back surface being opposite facing surfaces of the same plane, the front surface being a currently visible surface of the metaphoric desktop resulting in the first execution results being currently visible, render second execution results of a second one or more applications on the back surface of the metaphoric desktop, currently invisible while the front surface is currently visible, resulting in the second execution results being currently invisible, and morph the back surface to replace the front surface to become the currently visible surface of the metaphoric desktop to make the second execution results visible and make the first execution results invisible; and
   a processor coupled to the communication interface and storage medium to execute the programming instructions.

27. The system of claim 26, wherein said second one or more applications are on-line applications, and the programming instructions are further designed to monitor for the apparatus being connected on-line.

28. The system of claim 26, wherein said programming instructions are further designed to morph from said front surface of the metaphoric desktop to the back surface of the metaphoric desktop in response to detection of an event.

29. A computer readable medium comprising:
   a storage medium; and
   a plurality of programming instructions stored in the storage medium, and designed to enable an apparatus to render on a display, a metaphoric desktop having a front surface and a back surface, said front surface and said back surface being opposite facing surfaces of the same plane, to render first execution results of first one or more applications on the front surface of a metaphoric desktop, the front surface being a currently visible surface of the metaphoric desktop resulting in the first execution results being currently visible, to render second execution results of a second one or more applications on the back surface of the metaphoric desktop, the back surface being currently invisible while the front surface is currently visible, resulting in the second execution results being currently invisible, and to morph the back surface to replace the front surface to become the currently visible surface of the metaphoric desktop to make the second execution results visible and make the first execution results invisible.

30. The computer readable medium of claim 29, wherein said second one or more applications are on-line applications, and the programming instructions are further designed to enable the apparatus monitor for the apparatus being connected on-line.

31. The computer readable medium of claim 29, wherein said programming instructions are further designed to morph from said front surface of the metaphoric desktop to the back surface of the metaphoric desktop in response to detection of an event.

* * * * *